United States Patent
Roller et al.

[11] Patent Number: 5,964,982
[45] Date of Patent: Oct. 12, 1999

[54] METHOD OF REMOVING ENCRUSTATIONS IN EVAPORATION PLANTS

[75] Inventors: Günter Roller, Bad Homburg; Dieter Stein, Wiesbaden; Ulrich Wagner, Bernburg; Ludwig Englmaier, Trostberg, all of Germany

[73] Assignee: Metallgesellschaft Aktiengesellschaft, Frankfurt am Main, Germany

[21] Appl. No.: 08/895,295

[22] Filed: Jul. 16, 1997

[30] Foreign Application Priority Data

Jul. 23, 1996 [DE] Germany ............................ 196 29 641

[51] Int. Cl.⁶ ...................................................... B01D 1/00
[52] U.S. Cl. ........................... 159/47.1; 159/17.4; 159/22; 165/95
[58] Field of Search .................. 159/16.3, 17.4, 159/22, 47.1, 27.4; 165/95

[56] References Cited

U.S. PATENT DOCUMENTS

| | | | |
|---|---|---|---|
| 1,581,545 | 4/1926 | Prache | 159/47.1 |
| 3,245,460 | 4/1966 | Loebel | 159/24.1 |
| 5,137,081 | 8/1992 | Klaren | 165/95 |

*Primary Examiner*—Hien Tran
*Assistant Examiner*—James Kennedy
*Attorney, Agent, or Firm*—Sprung Kramer Schaefer & Briscoe

[57] ABSTRACT

A solution to be evaporated is passed through one or several evaporation stages. In each evaporation stage, the solution is circulated between a heat exchanger and an evaporating vessel, and steam is withdrawn from the evaporating vessel. For removing crusts, the evaporation in the respective evaporation stage is interrupted, and a cleaning suspension containing at least 3 wt % granular solids is circulated through the heat exchanger and the evaporating vessel. The solids, which have an abrasive effect, remove the crusts. Preferably, the solution to be evaporated is circulated through the evaporation stage for removing the crusts, where the heat exchanger is heated and the cleaning solution is evaporated to such an extent that solids crystallize out and a cleaning suspension is formed.

5 Claims, 1 Drawing Sheet

METHOD OF REMOVING ENCRUSTATIONS IN EVAPORATION PLANTS

BACKGROUND OF THE INVENTION

This invention relates to a method of evaporating a solution in one or several evaporation stages, where in each evaporation stage solution is circulated between a heat exchanger and an evaporating vessel, and steam is withdrawn from the evaporating vessel, and where during the evaporation substances from the solution form crusts. These crusts frequently occur in the vicinity of the heating surfaces of a heat exchanger.

In evaporation plants, there must frequently be expected encrustations which impede the further operation or make it necessary to switch off or clean encrusted parts of the plant. When solutions are evaporated to crystallization, crusts as a result of impurities in the solution are frequently formed already in evaporation stages without crystallization through deposition of impurities.

During the removal of the crusts, there is usually required a time-consuming disassembly of the plant components. When cleaning is effected by means of a high-pressure water jet, this is expensive and not harmless. In some cases, a pre-treatment with special chemicals must be effected prior to the high-pressure cleaning, so as to render the crusts attackable for the high-pressure cleaning. In other cases, crusts are dissolved by means of chemicals. This involves the additional problem of the disposal of these chemicals.

SUMMARY OF THE INVENTION

It is the object underlying the invention to quickly and inexpensively provide for the removal of crusts by means of the above-mentioned method. In accordance with the invention this is achieved in that for removing the crusts the evaporation in the associated evaporation stage is interrupted, and a cleaning suspension containing at least 3 wt % granular solids is circulated through the heat exchanger and the evaporating vessel, where the solids have an abrasive effect. When the cleaning suspension flows through the respective parts of the plant, the solids remove the crusts. It is recommended to guide the cleaning suspension along the crusts at a certain flow rate by means of a pump. In this way, crusts can be removed in particular from the heating surfaces of the heat exchanger or also from other points of the pipe conduits.

The content of granular solids in the cleaning suspension usually lies in the range from 3 to 50 wt %, and preferably from 5 to 30 wt %. The upper limit of the solids content in the cleaning suspension is reached when the suspension can hardly be circulated by means of a pump as a result of its viscosity.

The cleaning suspension may be formed in different ways. It is for instance possible to mix water or some other liquid or solution with granular solids, e.g. foreign substances such as sand, or other insoluble solids, and use the suspension as cleaning suspension. It is also possible that the cleaning suspension contains solids that crystallize out during the evaporation of a solution, which may either be the solution to be evaporated, which is being used in the process, or a foreign solution. Thus, there may also be used a completely or largely evaporated suspension, which contains precipitated crystals in a sufficient concentration.

A very expedient possibility of forming the cleaning suspension is obtained when several evaporation stages are employed. When crusts are formed for instance in the heat exchanger of an evaporation stage, through which during the evaporation a solution virtually free from solids is circulated, the stage is first of all separated from the evaporation for removing the crusts and is switched over to the cleaning operation. For this purpose, solution to be evaporated is supplied to the stage, where the heat exchanger is heated, so that the cleaning solution partly evaporates, and solids crystallize out of the cleaning solution. The solids-containing cleaning suspension thus formed is then circulated until the crusts have been removed. While an evaporation stage is switched to cleaning operation, it will mostly be possible to continue the evaporation in the remaining stage or stages under partial load.

The method of removing crusts may be used for different evaporation plants, and by way of example only reference is made to plants for evaporating NaCl-containing waste water from the flue gas purification of waste incineration plants. The crusts to be removed include for instance sulfates, carbonates or silicates such as gypsum or alkaline earth carbonates.

Embodiments of the method will be explained with reference to the drawing, wherein:

DETAILED DESCRIPTION OF THE INVENTION

Figure 1:
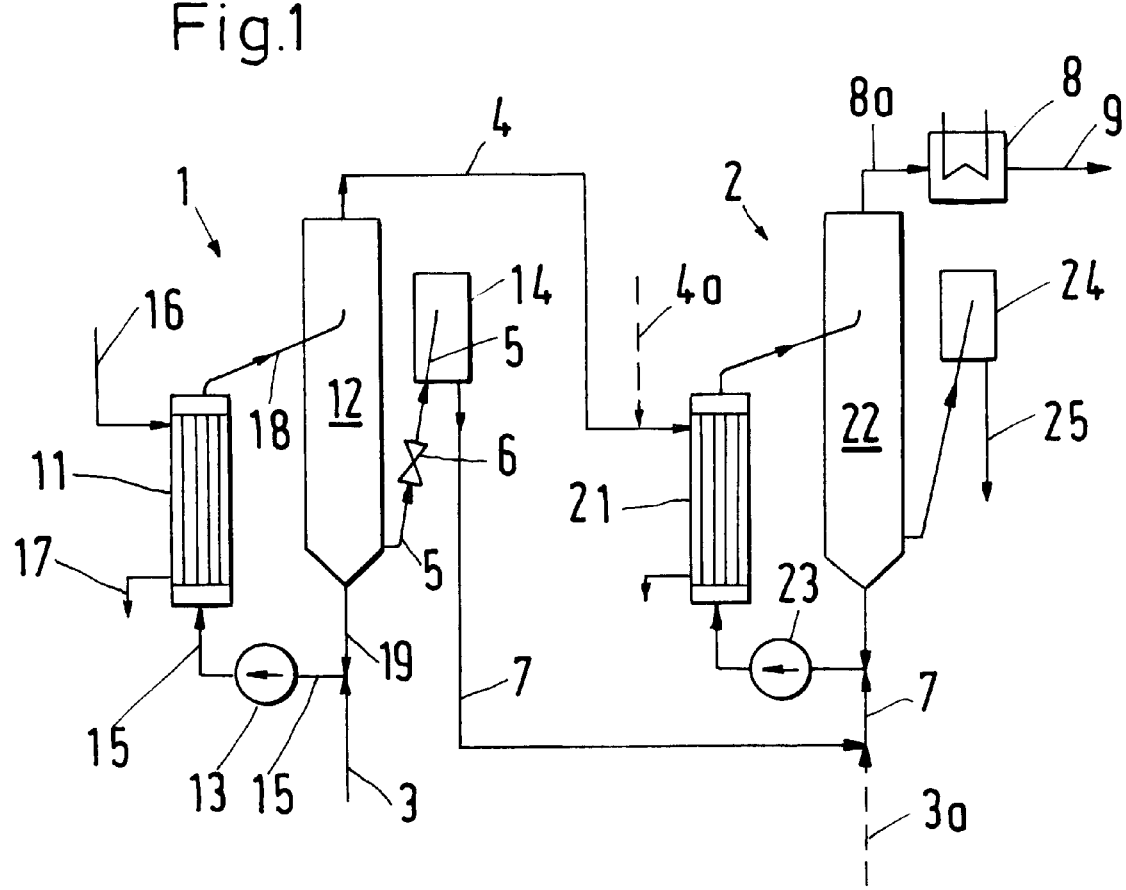
FIG. 1 shows a two-stage evaporation plant.

In accordance with FIG. 1 the essential parts of the first evaporation stage 1 are the indirect heat exchanger 11, the evaporating vessel 12, the circulating pump 13 and the discharge container 14. The solution to be evaporated is supplied through line 3, and through line 15 is delivered to the solution circuit and the heat exchanger 11, to which for instance steam is supplied as heating medium through line 16. Cooled heating medium is removed through line 17. Through line 18, heated solution flows into the evaporating vessel, from which vapour is withdrawn through line 4. The circulated solution leaves the evaporating vessel 12 through line 19. The remaining, already concentrated solution flows through line 5 and the opened valve 6 to the discharge container 14, and is introduced into the final evaporation stage 2 through line 7. Stage 2 basically operates in the same way as the above-described preconcentration stage 1. The final stage 2 comprises the heat exchanger 21, the evaporating vessel 22, the circulating pump 23, and the discharge container 24. The vapours withdrawn from the evaporating vessel 22 first flow to the condenser 8 through line 8a, residual gas is withdrawn via line 9. Crystal-containing suspension is withdrawn from the container 24 through line 25.

When disturbing crusts have formed in the preconcentration stage 1, for instance on the heating surfaces of the heat exchanger 11, the evaporation is switched off for this stage, and the cleaning operation is started. For this purpose, the valve 6 is closed, and the solution to be evaporated is supplied wholly or in part through line 3a indicated in broken lines directly into the final stage 2. Stage 2 may be operated under partial load; additional heating medium in the form of live steam may be supplied through line 4a.

During the cleaning operation in the preconcentration stage 1, heating medium is supplied to the heat exchanger 11 through line 16 in such an amount that the circulated solution is evaporated intensively and solids crystallize out. The cleaning suspension thus formed is circulated through the pump 13, the heat exchanger 11 and the evaporating vessel 12, until the disturbing deposits have been removed. During this period, a certain part of the solution to be evaporated is supplied through line 3, so as to allow for the formation of crystals in the circuit of stage 1. When the deposits have been removed, the normal evaporation may be resumed.

EXAMPLE

Figure 2:
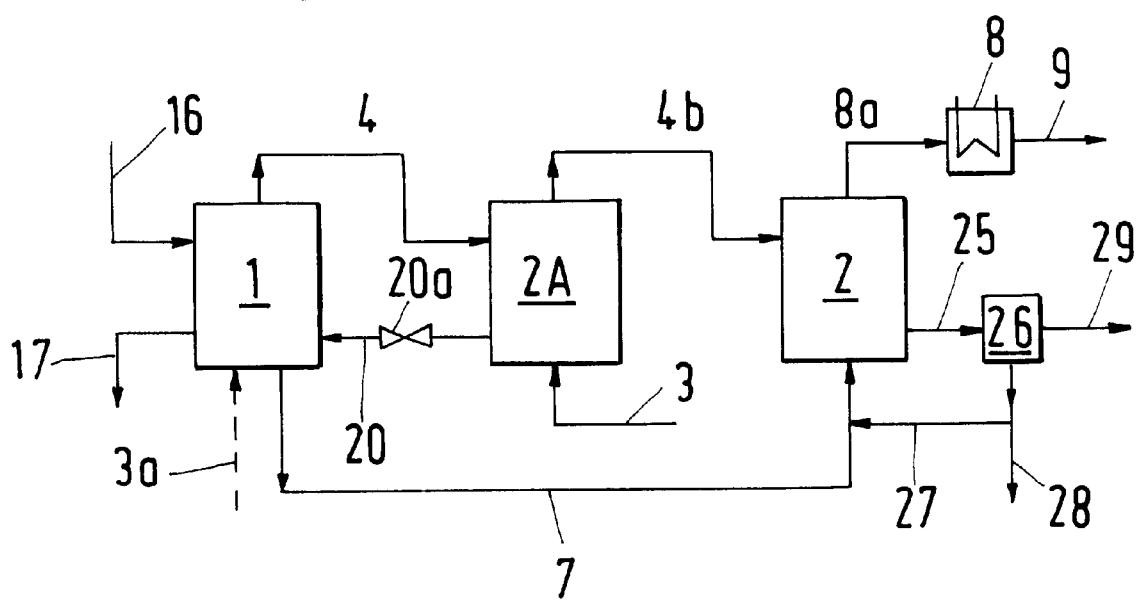
FIG. 2 shows a three-stage evaporation plant in a schematic representation.

In the procedure in accordance with FIG. 2 three evaporation stages 1, 2A and 2 are employed. The reference numerals have the meaning already explained in conjunction with FIG. 1. In the normal operation, the brine line 20 connects stage 2A with stage 1 with the valve 20a opened; through lines 4 and 4b vapours are supplied to the not represented heat exchanger of the adjacent stage 2A or 2. From the evaporated solution of line 25 salt is separated in a centrifuge 26, which salt is discharged via the path 29. Part of the mother liquor coming from the centrifuge is returned to the solution circuit of stage 2 via line 27, and the rest of the mother liquor is withdrawn via line 28.

During the normal operation with the three evaporation stages 1, 2A and 2, 7574 kg/h brine with an NaCl content of 123 g/l and a temperature of 55° C. are supplied to the stage 2A through line 3. The brine comes from a plant for cleaning flue gas of a waste incineration plant, and apart from NaCl in particular contains small amounts of Ca, sulfate and carbonate ions as well as silicates, which tend to form crusts in the evaporation plant. Line 3a is not used. The temperatures in the various lines are as follows:

| Line | 16 | 4 | 4b | 8a |
|---|---|---|---|---|
| Temperature | 130° C. | 85° C. | 70° C. | 55° C. |

2500 kg/h steam of 2.5 bar are supplied via line 16; in the condenser 8 a pressure of 0.11 bar exists; 621 kg/h NaCl crystals are withdrawn via the path 29; and 956 kg/h mother liquor are removed through line 28. In the three evaporation stages and in the condenser 8 a total amount of 8500 kg/h condensates are produced, namely 6000 kg/h vapour condensate and 2500 kg/h live steam condensate in line 17.

When crusts must be removed in stage 2A, this stage is separated from the evaporation by closing the valve 20a, and the brine to be evaporated is directly supplied to stage 1 through line 3a in the reduced amount of 4900 kg/h. At the point of separation, the NaCl concentration in the solution circulating in stage 2A is 169 g/l. Through line 3, 2651 kg/h of the brine to be evaporated are supplied to this stage, so as to effect the formation of salt crystals. After 7 hours, the suspension recirculated in stage 2A contains 15 wt % salt crystals, the circulation of the suspension is continued for another 12 hours, and the crusts disappear. The suspension is supplied to a reservoir for brine to be evaporated, and stage 2A may then again be included in the normal three-stage evaporation.

What is claimed is:

1. A method of evaporating a solution in one or more evaporation stages, wherein each evaporation stage comprises a heat exchanger and an evaporation vessel, the method comprising the steps of: circulating solution to be evaporated through the heat exchanger and the evaporating vessel in each stage; withdrawing vapor produced by evaporation from the evaporation vessel of each stage; and removing crust formed from substances in the solution during evaporation in an evaporation stage by interrupting the evaporation of the evaporation stage and circulating a cleaning suspension through the heat exchanger and the evaporating vessel, wherein the cleaning suspension contains at least 3 wt % granular solids having an abrasive effect and which crystallize out during evaporation of the cleaning suspension.

2. The method according to claim 1, comprising at least two stages and wherein the cleaning suspension is formed in each stage with crust by circulating the cleaning suspension, partly evaporating the cleaning suspension and crystallizing the cleaning suspension.

3. The method according to claim 2, wherein the solution to be evaporated is used as the cleaning suspension.

4. The method according to claim 2, wherein during the circulating of the cleaning suspension in a stage with crust, stages without crust circulate solution to be evaporated.

5. The method according to claim 4, wherein the stage with crust has not reached a final concentration during circulation of solution to be evaporated.

* * * * *